C. E. ROSS.
ANTISLIPPING TIRE ARMOR.
APPLICATION FILED NOV. 23 1917.
1,340,629.
Patented May 18, 1920.
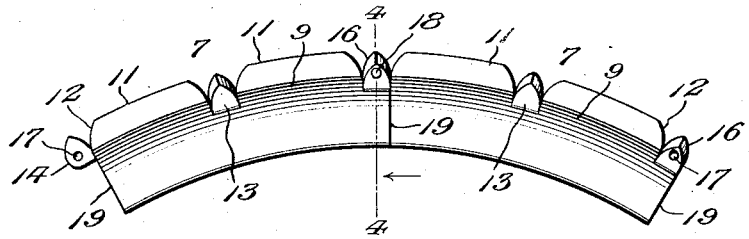
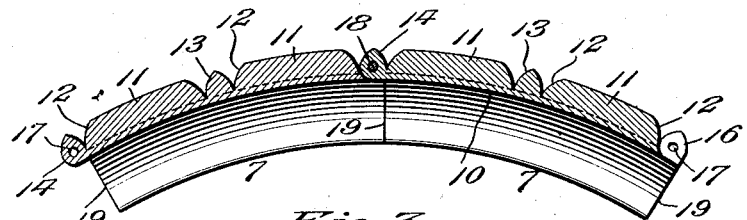
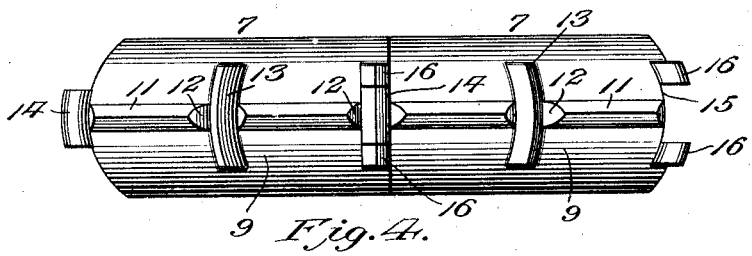
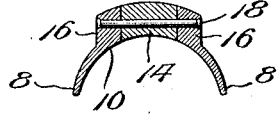
Inventor
Charles Elett Ross,
By Frank A. Kane, Attorney
Witness
Edwin F. McKee

UNITED STATES PATENT OFFICE.

CHARLES ELEETT ROSS, OF LEBANON, OHIO.

ANTISLIPPING TIRE-ARMOR.

1,340,629.  Specification of Letters Patent.  Patented May 18, 1920.

Application filed November 23, 1917. Serial No. 203,604.

*To all whom it may concern:*

Be it known that I, CHARLES ELEETT ROSS, a citizen of the United States, residing at Lebanon, Ohio, have invented certain new and useful Improvements in Antislipping Tire-Armor, of which the following is a specification, reference being had therein to the accompanying drawing.

This invention comprises an antislipping tire armor. It is contemplated among the objects of this invention to provide a punctureless tire protector, preferably made in sections or segments of a circle, and hingedly connected together so as to conform, when assembled, with the contour of the surface of a tire casing and be capable of application thereto in such a manner that the sides of the protecting device will extend down a substantial distance along the side of the tire casing; wherein there will be no openings in, or between the sections of the protector which might permit the insertion of an object to puncture or damage the tire, and wherein the inner surface of the protector presents a plane surface for engagement with the surface of the tire casing.

A further object is to provide a device of this character which will be, when assembled, slightly smaller than the largest outside dimension of the tire to which it is to be attached, so that, when inflated, the tire will grip and hold firmly the armor in position; which will provide a good road gripping tread surface; the cleats or projections of which are preferably in the same plane at their outer surface so as to prevent unnecessary jarring when running over a smooth surface or hard material; which will have no unnecessarily protruded parts to throw mud and dust; and which will be readily attached to and detached from a tire.

Other objects and advantages will in part be apparent, and in part be brought out more fully in the description which follows.

A drawing illustrating a form of the device is hereto annexed, the following views being shown:—

Figure 1, is a view in side elevation showing two connected sections embodying my invention;

Fig. 2, is a view in longitudinal section thereof;

Fig. 3, is a top plan view;

Fig. 4, is a view in transverse section on the line 4—4 of Fig. 1.

Referring specifically to the drawings, 7 designates a section of a tire armor embodying my invention. There are a plurality of these, connected together, each section being curved to conform with the curve of a tire, and so arranged that when assembled, they will completely incase the tire to which they are to be attached.

Each section comprises sides 8, tread surface 9, and an inner, tire engaging surface 10. Disposed upon the tread surface of each section, and preferably arranged centrally along the length thereof, there are a plurality of spaced-apart cleats or gripping members 11. These are preferably of epicycloidal-shape, their bases being secured to the tread surface of each section, and at their extremities, these cleats are beveled or tapered off as at 12.

Disposed upon the tread surface of the protector between the longitudinally disposed cleats, there are a plurality of cross cleats 13. These, like the longitudinally arranged cleats, are also epicycloidal-shaped in section, and are preferably extended over the road engaging surface of the tread portion of the protector only, being cut off on the sides, as best seen in Figs. 3 and 4. The shape of the cross cleats, in section, is approximately the same taper as the beveled portion 12 on the ends of the longitudinal cleats, and the outer edges of the base portion of the cross cleats meet the extremities of the bases of the longitudinal cleats. This arrangement, together with the abrupt cutting off of the cross-cleats at their extremities so that they will not extend down over the sides of the tire protector, minimizes the raising of dust and the throwing up of mud and water. The tread surfaces of the cross and longitudinal cleats are preferably in the same circumferential plane, so that when running on a smooth hard surface there will be no jar due to inequality or indentations in these surfaces.

Means are provided for connecting a plurality of these sections together, and in the present instance, such means are formed as a portion of the cross-cleats. To this end, there is provided at one end of each section a protruding lug 14 which constitutes, at its tread portion, a part of one of the cross-cleats. At the other extremity of the section there is a cut-away or indented portion 15, and a plurality of lugs or projecting portions 16, in spaced relation. These lugs and the lug 14 are provided with a bore 17, adapted to be in alinement when the lug 14 is inserted in the indented portion 15 of the next corresponding section, and a cross-pin or hinge member 18 inserted to connect the sections together.

The lugs 16, and the lug 14 are of the same outer contour, so that when assembled in the manner aforesaid, they will, together, constitute a cross-cleat. Each section is tapered at its extremities as at 19, so that when assembled, end-to-end, the sections will form a continuous and unbroken protector conforming to the outer contour of the tire to which it is to be attached.

The arrangement of the cleats previously described, in which the cross and longitudinal combination is used, forms a useful arrangement for drive-wheels. The cross-cleats insure a good traction or driving grip with the road surface, and the longitudinal cleats insure a positive forward movement which eliminates side skidding.

In constructing a protective armor in the manner just described, the sections are preferably made of metal, and so arranged that the interior dimension when assembled, will be slightly smaller than the outer dimension of the tire to which it is to be attached, so that when inflated, the tire will be positively locked with the armor, and thus prevent movement between these members.

From the foregoing, it will be apparent that the present invention provides a device of the character set forth which meets the objects and advantages enumerated, and while I have disclosed the invention in the embodiment herein illustrated, it will be understood that I do not wish to limit myself to the precise form of this disclosure, as many changes may be made in the construction and arrangement of the parts without departing from the spirit of the invention or sacrificing its chief advantages.

What I claim is:—

A tire armor comprising a plurality of arcuate-shaped sections, each including a tread portion, sides, and a tire-engaging portion; each section having a portion of an epicycloidal-shaped cross-cleat, in the form of a lug, disposed on one end of the section; a plurality of similar portions projecting from the opposite end of the section, whereby, when assembled with the lug on one end of a section associated with the plurality of lugs on the next succeeding section, a complete epicycloidal-shaped cross-cleat is formed; a circumferentially disposed cleat on the tread portion between the cross-cleats; and means for securing the sections together to constitute a complete armor adapted to cover the sides and tread portion of a tire and of slightly smaller dimensional area at its tire-engaging portion than the tire, whereby the armor will be securely retained in engagement with the tire when the latter is inflated.

In testimony whereof I affix my signature hereto.

CHARLES ELEETT ROSS.